March 26, 1974  R. D. TALTY ET AL  3,799,823

METHOD FOR SPLICING COLLAGEN CASING

Filed March 30, 1972  2 Sheets-Sheet 1

United States Patent Office 3,799,823
Patented Mar. 26, 1974

3,799,823
METHOD FOR SPLICING COLLAGEN CASING
Robert D. Talty and Lionel C. Arnold, Danville, Ill., assignors to Tee-Pak, Inc., Chicago, Ill.
Filed Mar. 30, 1972, Ser. No. 239,605
Int. Cl. A22c 13/00
U.S. Cl. 156—86                                     4 Claims

ABSTRACT OF THE DISCLOSURE

Accumulated fluids are vented from extruded collagen casing by cutting the casing at periodic intervals. The casing is cut completely in two just ahead of the dryer and is spliced by placing the cut ends of the casing onto a tubular coupler and shrinking them onto the coupler by applying heat. Apparatus is disclosed for supplying heated fluid to the periphery of the casing to be spliced in order to shrink the casing onto the tubular coupler.

BACKGROUND OF THE INVENTION

This invention relates to a new and improved method of making collagen casings wherein fluids accumulated in a collagen casing are vented by cutting the casing just ahead of the dryer and then splicing the casing onto a tubular coupling.

Natural casings are prepared from the intestines of various edible animals, particularly cattle, hogs and sheep. The intestines are removed from the slaughtered animal and are thoroughly cleaned by processes well known in the art. Natural casings which have been thoroughly cleaned are stuffed with various sausage meat compositions and formed into sausage links in preparation for cooking. The sausages which are thus formed are cooked by the consumer and the sausage casings eaten with the cooked sausages. In the preparation of certain smoked or precooked sausages, such as frankfurters and the like, the sausage is cooked or smoked or otherwise processed by the meat packer to render it edible by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages, such as bolognas, salamis, and the like, and are removed from the sausage by the consumer at the time of final preparation for eating. Regenerated cellulose casings are also used in the preparation of frankfurter sausages wherein the casing is stuffed with sausage emulsion, linked, smoked, and cooked, and the casing removed from the finished sausage prior to delivery to the customer.

Regenerated cellulose casings have not been satisfactory for the processing of pork sausages inasmuch as cellulose is not edible with the sausage and does not transmit the fat which is released from the sausage during cooking and does not shrink with the sausage during cooking. As a result, there has been some demand for an artificial sausage casing which is edible and which has the properties desired in a casing to be used in the processing of pork sausage.

Over a period of many years, synthetic sausage casings have been prepared from animal collagen. Casings made of collagen have been made by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen is an edible material. More recently, edible sausage casings of collagen have been prepared and sold in commercial quantities.

In the preparation of edible collagen casings, hide collagen is converted into a finely-divided fibrillar form and extruded in the form of a dilute collagen slurry, e.g., from 2–6% collagen content. The extruded collagen is passed into a sodium sulfate and/or ammonium sulfate coagulating bath which dehydrates the collagen slurry and forms a coherent collagen film. At this stage in the processing, however, the salt-coagulated collagen film can be handled but will revert to a thin slurry upon further contact with water. It is, therefore, necessary to harden or tan the extruded collagen film to permit further processing of the film and to provide the film with sufficient strength for use as a sausage casing. A satisfactory tanning process must utilize a tanning agent which is very rapid in tanning action and completely non-toxic in the form in which it is present in the finished casing and must produce a casing of sufficient strength to be stuffed with sausage meat, linked, packaged, and finally cooked.

Edible collagen casings can be prepared using animal collagen materials converted into a suitable paste or slurry for extrusion as a hollow tube, and coagulated in a salt coagulation bath, and then tanned or hardened in a tanning solution consisting of, for example, a dilute solution of glutaraldehyde in an acidic aqueous solution of a phosphate salt, dilute formaldehyde, glutaraldehyde, etc., and salts of iron or aluminum. The tanned casing is washed, plasticized, and then dried, reeled, and finally shirred and packaged.

During the coagulating, tanning, and plasticizing steps water is entrapped within the tubular casing by an osmotic effect. Water enters the casing because its activity in the concentrated salt solution initially within the casing is less than its activity outside the casing. In order to prevent the casing from stretching unduly and perhaps bursting, the water must be released by puncturing the casing. In order to effect a release of these fluids, the casing is cut periodically by cutting longitudinally through the surface of the fluid-inflated casing, producing a slit type opening.

The casing is then dried in an inflated state by trapping a bubble of air between two sets of squeeze rolls, maintained at the entrance and exit of a hot air dryer. In order to effect continuous inflation for drying, the casing must be free of any punctures.

Accordingly, it has been the practice to cut out that section of casing containing the puncture prior to its entrance into the dryer. The cut ends of the casing were then connected together in such a manner as to allow for the continuous passage of air through the interior of the tubing. The connection was formed by inserting into a cut end of the casing a short, flexible rubber tube or coupling. The other cut end of casing was slipped over the first end containing the tubular coupling and the two ends held together on the coupling as by circumferentially winding and knotting a piece of string or casing over the telescoped cut sections. The coupling insert permitted free passage of air within the casing as it passed through the dryer, thus providing a bubble for inflating the tube during the drying operation, said bubble being continuously maintained by the aforedescribed squeeze rolls.

The main disadvantage is the time and discontinuity involved in effecting this closure, as winding and knotting the string or casing slows down the production of the casings.

Bonding of laminating collagen to itself or to other materials when the collagen is dry is well known. However, attempts to seal a puncture in wet collagen by either coating the puncture with a film-forming material or using adhesive patches have generally not been successful. Adhesive materials, such as animal and vegetable glues, viscose, rubber adhesives, and other polymeric compositions, do not bond sufficiently and rapidly enough to wet collagen to form a seal resistant to the inflating air pressure and the shear forces which occur when the wet collagen tubing is dried in the inflated state.

The failure of such adhesive patches to perform satisfactorily can be accounted for by the extremely high moisture content of the collagen casings immediately prior to drying. Typically, the casings, after passing through coagulating, tanning, and plasticizing baths, contain from about 60 to about 80% by weight of water. The presence of such large amount of water, in the case of the water-soluble animal or vegetable glues or viscose, causes dilution of the glue and results in weak bonds. In the instance of the rubber adhesives, the water content of the wet casing inhibits wetting of the collagen surface by water-insoluble rubber adhesive.

SUMMARY OF THE INVENTION

This invention is based on the fact that collagen shrinks severely on application of heat, which property can be used to advantage in the manufacture of collagen casings. Collagen casing can be slit to vent the fluids entrapped in the casing during the tanning and washing steps. The slit portion is then cut out, the cut ends placed, either overlapping or butted, onto a tubular coupler and secured in place by applying heat. The heat causes the collagen casing to shrink tightly onto a hollow tubular coupler for the drying step, permitting free passage of air within the casing as it is passed through the dryer. The coupler is removed after the casing passes through the dryer and before it is wound up on reels. The casing is cut at intervals sufficient to effect release of fluids trapped within the casing; the pairs of cut ends are then shrunk onto tubular couplers for drying.

A preferred means for applying heat to the collagen casing to shrink the casing onto the coupler is a tubular sleeve arrangement which passes hot air around a manifold and out through individual passages to blow onto the periphery of the collagen casing to cause it to shrink onto the coupler.

Figure 4:
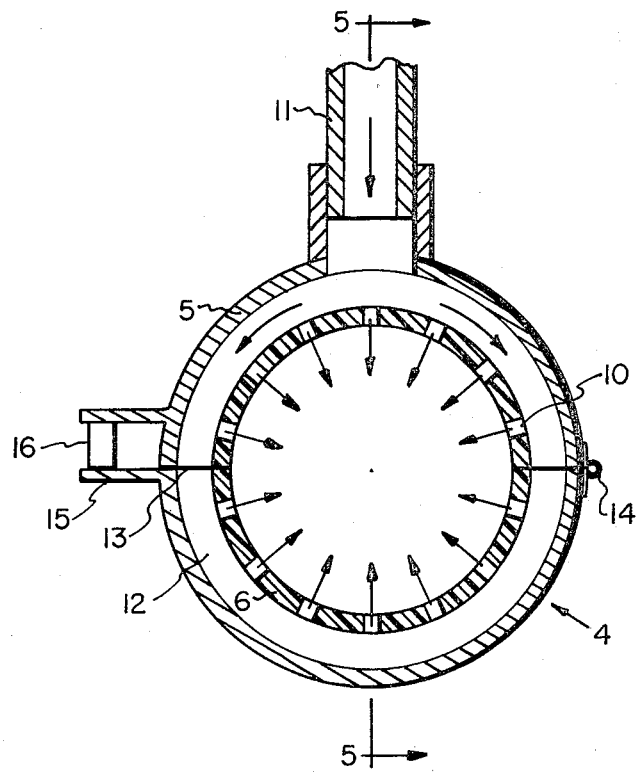
Figure 5:
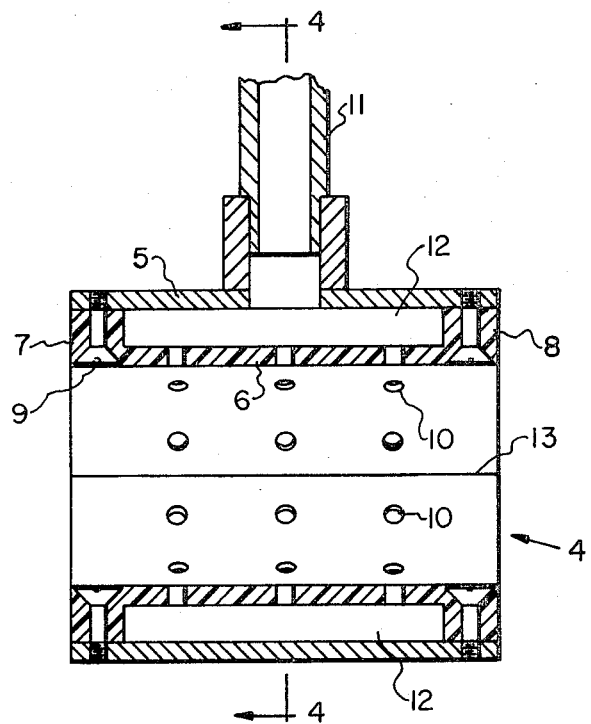

FIG. 4, which is a cross-section taken on the line 4—4 of FIG. 5, shows a tubular sleeve arrangement for passing hot air around a manifold and through individual passages to blow onto the periphery of the collagen casing to cause it to shrink onto the coupler.

FIG. 5 is a view in cross-section taken along line 5—5 of FIG. 4.

DESCRIPTION OF THE PREFERRED EMBODIMENTS

Collagen tissues which are suitable for preparation of extruded collagen casings are obtainable from hide and tendon, although hide collagen is preferred for casing manufacture. Collagen is formed of a large number of fibers which in turn consist of a much greater number of fibrils of submicroscopic size. Collagen fibrils have a diameter of the order of 10–50 angstroms and lengths ranging from several thousand up to several million angstroms.

Animal hide, either fresh, frozen, or salt-cured, is defleshed and the hair and the epidermal layer mechanically removed, e.g., by abrading, scraping, splitting, etc. Enzymatic dehairing of the hide may also be used if desired. The hide is optionally limed, and is next cut into small pieces and passed through a meat grinder until reduced to a very small size. The ground collagen is then swollen in a solution of an organic acid such as lactic acid or citric acid to produce a slurry having a collagen content in the range of from about 2–6%, preferably about 3.5–5%.

The collagen slurry is extruded through an annular die into a coagulating bath consisting of concentrated aqueous sodium sulfate or ammonium sulfate solution. The slurry is preferably passed through a die having counter rotating parts at the annular opening to orient the outer and inner portion of the extruded tube to provide a tubular casing of improved strength. The resulting tubular collagen film or casing is then passed into a hardening or tanning bath, preferably consisting of a ferric or aluminum salt in an olated form, an edible aldehyde, vegetable tannin such as tannic acid, or the like. The tanned or hardened casing is then washed and plasticized. The plasticizing bath is preferably an aqueous solution of glycerin or similar plasticizing material (e.g., sorbitol, dipropylene glycol or triethylene glycol) and may contain a softening agent emulsified in the plasticizing agent using a suitable emulsifying agent such as sodium dodecyl sulfate or polyoxyethylene (20) sorbitan monopalmitate, or the like. The casing is then dried in an inflated state and reeled in preparation for shirring or other processing.

At the point of extrusion, the casing is inflated by coagulant solution circulated into the interior of the extruded tube as well as by water entering the casing by osmosis. Additional fluids enter the casing by osmosis during the tanning and plasticizing steps. As noted previously, it has been customary to cut the casing periodically by puncturing or by making longitudinal slashes with a sharp knife or razor blade to produce a slit-type opening. This cutting or puncturing of the casing is generally done after coagulating, tanning, and plasticizing the casing. The cut or puncture allows the fluids within the casing to vent. The casing is subsequently cut to remove the portion containing the puncture of slit and the cut ends connected by placing the cut ends of casing over a tubular rubber coupler and tying the same in place.

Figure 1:
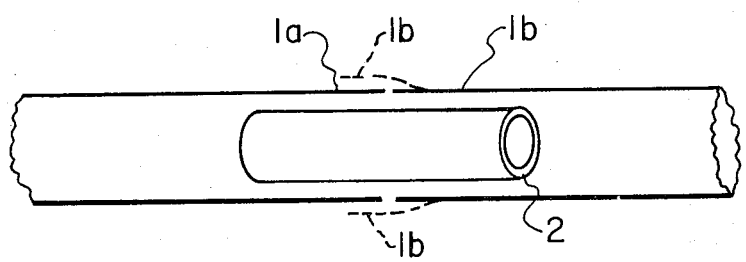
FIG. 1 shows cut ends of collagen casing placed over a tubular coupler and heat applied to shrink the casing onto the coupler.
Figure 2:
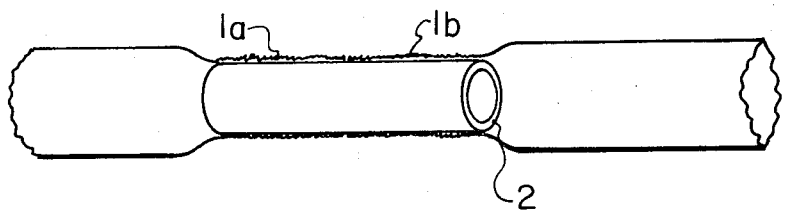
FIG. 2 shows the casing heat shrunk onto the coupler.
Figure 3:
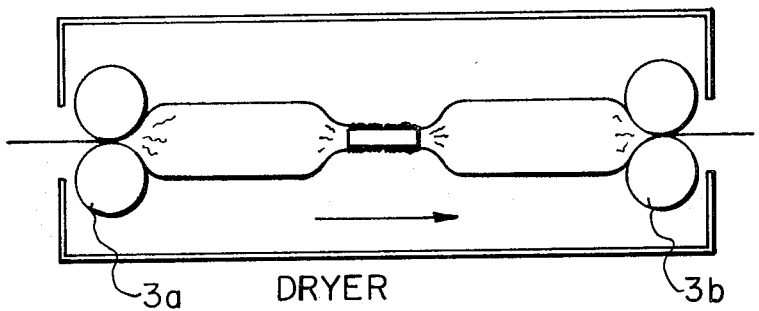
FIG. 3 shows passing of inflated casing and coupler through the dryer.

In the present invention, the casing is slit or punctured to vent the fluids present in the casing. The punctured or slit portion is subsequently cut out at a point of slack maintained just ahead of the dryer. As shown in FIG. 1, the cut ends of the casing 1a and 1b, are overlapped (in dotted line) or butted (in solid line) on a tubular rubber coupler, 2. Heat is applied to the overlapped ends of the casing to shrink it onto the coupler, to form a continuous tube as shown in FIG. 2. The passing of the collagen casing and coupler through an air dryer is shown in FIG. 3. Two sets of squeeze rolls, 3a and 3b, located at the entrance and exit of the dryer, respectively, maintain a continuous isolated bubble of air in the spliced casing.

A preferred apparatus for applying heat for shrinking casing onto couplings is the manifold apparatus 4 shown in FIGS. 4 and 5. Manifold apparatus 4 comprises outer cylinder 5 and inner cylinder 6 supported on end walls 7 and 8 by a plurality of screws 9. Inner cylinder 6 has a plurality of holes or ports 10. Conduit 11 opens into outer cylinder 5 for introduction of heated air into annular space 12 for distribution and exit through ports 10. The entire manifold assembly is split in two along the line 13 and is secured at one side by hinge 14 and at the other side by a magnetic latch comprising flange 15 and electromagnet 16. When the electromagnet 16 is de-energized, the lower half of the manifold apparatus falls open for insertion of a coupling with casing positioned for application of heat. The lower half of the apparatus is then closed and electromagnet 16 re-energized to hold it closed. Heated air is then introduced through inlet conduit 11 and ports 10 to impinge peripherally on the casing and coupler. This air is preferably at a temperature of about 100°–150° C. so that the collagen casing shrinks rapidly onto the hollow rubber coupling.

After the cut casing has been shrunk onto the coupler, it is inflated and dried with the aid of heated air circulated by a fan or blower. After being dried, the coupler is cut out and the ends of the casing taped together so that the casing may be rolled up on a reel. The casing is then passed to a shirring machine of the type used in shirring regenerated cellulose casings. The casing is shirred into individual short stands and packaged for shipment.

The following nonlimiting examples are illustrative of the application of this invention to the preparation of an edible collagen casing.

EXAMPLE 1

Selected cow hides from carcasses certified fit for human consumption, weighing about 65–75 pounds each, are the starting material for this process. As soon as possible after flaying and inspection, the hides are washed in a large volume of circulating cool (10° C.) water to remove adhering blood. After washing, the hides are fleshed without curing to remove adhering fatty and muscular debris from the flaying operation.

The washed and fleshed hides are then treated in a liming bath which is generally an aqueous solution of calcium hydroxide and sodium sulfhydrate, and optionally, dimethylamine sulfate. The treatment is carried out for less than six hours, which is sufficient to remove most of the hair from the hide, and the hides are gently agitated periodically to insure more even penetration of the liming liquor.

After liming, the hides are removed from the liming bath and permitted to drain for a period of ½ hour while suspended. The limed hides are then gently squeezed, as between rubber roller, to remove excess liming liquor.

The hides are then cut or split in the plane of the hide into two approximately equal portions by weight. The upper or outer hide surface contains all of the hair, hair follicles, sebaceous, and sudorific glands. The inner or corium layer consists substantially of collagen. The outer or hair containing layer or split is discarded as unsuitable for use in the preparation of casing but may be used for formation of leather laminates or coverings.

The corium splits are placed into a tank containing about 4.5 times the hide weight of water at a temperature of less than about 15° C. Gentle agitation is used to insure even removal of debris and of adhering lime solution and/or slurry. The hides are washed for about 20–30 minutes. The washings are removed and the corium splits resuspended in 4.5 times their weight of cool water. Edible grade lactic acid diluted to a concentration of 2–4 ounces of 44% lactic acid per quart of cool (15° C.) water is added in small portions at 15 minutes intervals, with gentle agitation for 5 minutes of each 15 minute period. The liquor is tested for pH before each addition, and the end point is regarded as the point when the pH is permanently depressed below 7.0. This treatment is effective to neutralize the excess lime in the corium layer and remove it as a soluble salt. The rate of addition of the lactic acid solution is carefully regulated so that the temperature of the bath is never permitted to rise above 32° C.

The corium splits are then removed from the neutralization bath, drained, rinsed in cool water, and stored in polyethylene bags below 5° C. prior to comminution and acid swelling operations in preparation for extrusion.

The delimed corium splits are cut into small square or reactangular sections, e.g., ⅕ to 4 inches on a side, in preparation for grinding. The small pieces of treated hide are converted to a fine pulp by successive passes through a meat grinder, the temperature of the hides being maintained below about 20° C. (and preferably below about 10° C.) with ice. When the hides have passed through a ³⁄₆₄ inch die, sufficient water is added to the pulp to produce a mixture consisting of about 90% water and 10% collagen.

The collagen pulp is then treated with sufficient dilute acid such as lactic, acetic, or citric acid to produce a pH of about 2.5–3.7. After thorough mixing, the pulp and acid are stored overnight at a temperature of about 3° C. to swell. At the end of this time the collagen is swollen and has taken up all of the water in the slurry. The swollen collagen is mixed with sufficient water and acid to maintain the pH of 2.5–3.7, thus producing a thin homogeneous aqueous paste consisting of about 4% collagen and 1.2% lactic acid.

The swollen collagen is passed through a homogenizer to further disperse the fibers and then is filtered to remove any undispersed fiber clumps or other solid contaminates. The paste is generally deaerated by storage under vacuum prior to extrusion. The homogenized and filtered collagen slurry is then pumped under pressure through an extrusion die into a coagulating bath consisting of about 40% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing.

From the wash bath, the casing next passes into a tanning bath comprising an aqueous solution of a suitable non-toxic tanning agent. Preferred tanning agents are aluminum or ferric salts in a partially basic olated form. Glutaraldehyde or formaldehyde may be used if thoroughly reacted with the collagen and all free aldehyde residue washed out.

From the tanning bath, the casing passes through one or more wash baths to remove all unreacted coagulating or tanning or hardening reagents. The casing is then passed through a plasticizing bath consisting of an aqueous solution of glycerin (or an equivalent plasticizer such as sorbitol, dipropylene glycol, triethylene glycol, etc.). The plasticizing bath introduces a substantial amount of the desired plasticizer into the casing which prevents it from becoming hard and brittle after drying.

During the coagulating, tanninng, and plasticizing steps water enters the casing by osmosis, because its activity in the concentrated salt solution initially within the casing is less than its activity outside the casing. In order to release these fluids, the casing is slit as described above.

The slit portion of casing is cut out just ahead of the dryer. The cut ends of the casing are then connected by placing the cut ends 1a and 1b on tubular rubber coupler 2. Tubular manifold apparatus 4 is placed circumferentially around the collagen surrounded coupler. Hot air enters the manifold through supply port 11, travels throughout the chamber 12 of the manifold, and exits through ports 10 in the manifold to heat the periphery of the collagen casing, causing it to shrink onto the coupler.

The casing is then dried in an inflated state by entrapping a bubble of air between two sets of squeeze rolls 3a and 3b, maintained at the entrance and exit of a hot air dryer. The coupler permits free passage of air within the casing as it passes through the dryer, thus providing a bubble for inflating the tube during the drying operation, said bubble being continuously maintained by the squeeze rolls.

The coupler is then cut out of the casing and the cut ends of the casing taped together. The casing is rolled up on reels an dthen shirred on a machine similar to the type used in the shirring of regenerated cellulose casings.

When this casing is used by the meat packer in a shirred form and stuffed with sausage meat and formed into links, a satisfactory sausage product is obtained. The casing functions well in stuffing and is formed easily by the linking machinery into the desired sausage links.

EXAMPLE 2

The improvement in splicing casings made from limed collagen is also obtained with casings made from unlimed collagen.

Selected steer hides from carcasses fit for human consumption, weighing about 65–75 pounds each, are the starting material for this process. As soon as possible after flaying and inspection, the hides are washed in a large volume of circulating cool (10° C.) water to remove adhering blood. After washing the hides are fleshed fresh without curing to remove adhering fatty or muscular debris from the flaying operation.

The washed and fleshed hides are then treated in dilute acetic acid for several days to partially swell the hide and loosen the hair. After the acetic acid treatment, the hides are split or cut in the plane of the hide into two approximately equal portions by weight. The upper or outer hide surface contains all of the hair, hair follicles, sebaceous, and sudorific glands; the inner or corium layer consists substantially of collagen. The outer or hair containing split is described as unsuitable for use in the preparation of casing, but may be used for the preparation of leather laminates or coverings.

The corium split is then neutralized in a dilute solution of sodium bicarbonate. The hides are then washed and cut into small sections as described in Example 1. The pieces of corium splits are then converted into a fine pulp by successive passes through a meat grinder. The pulp is mixed with lactic acid as described in Example 1, to cause it to swell to prepare a slurry suitable for extrusion. The slurry is then homogenized and filtered and extruded, tanned, and plasticized.

Fluids are then released from the tubular casing by slitting. The slit portion is cut out and the cut ends of the casing are then connected to allow for the continuous passage of air through the interior of the tubing. The cut ends of the casing are slipped over the tubular coupling and the casing is then shrunk onto the coupler by heating as in Example 1. The casing is then dried, shirred, and packaged as described in Example 1.

What is claimed is:

1. In the method of producing tubular sausage casings by continuous extrusion of an aqueous collagen slurry through an annular die, into coagulating, tanning, washing, and plasticizing baths wherein fluids accumulate within the extruded casing, slitting or puncturing said casing to vent accumulated fluids, cutting out the slit or punctured portion, and placing the cut ends of said casing over a tubular coupler, the improvement which comprises applying heat to the cut ends of said casing to shrink the same tightly onto said tubular coupler.

2. A method in accordance with claim 1 in which said cut ends are butted on said coupler.

3. A method in accordance with claim 1 in which said cut ends are overlapped on said coupler.

4. A method in accordance with claim 1 in which heat is applied to said cut ends of said casing on said coupler by impingement of heated air around the periphery thereof.

References Cited
UNITED STATES PATENTS

| | | | |
|---|---|---|---|
| 3,525,628 | 8/1970 | Couhly | 99—176 |
| 2,267,217 | 12/1941 | Reichel | 99—176 |
| 3,106,471 | 10/1963 | Firth | 99—176 |
| 2,420,310 | 5/1947 | Goodman | 99—176 |

ALFRED L. LEAVITT, Primary Examiner

F. FRISENDA, Jr., Assistant Examiner

U.S. Cl. X.R.

99—175, 176, 383